United States Patent Office 3,392,103
Patented July 9, 1968

3,392,103
INORGANIC PERMSELECTIVE MEMBRANES
Carl Berger, Corona Del Mar, Calif., assignor, by mesne assignments, to McDonnell Douglas Corporation, Santa Monica, Calif., a corporation of Maryland
No Drawing. Filed Nov. 29, 1963, Ser. No. 327,038
8 Claims. (Cl. 204—295)

ABSTRACT OF THE DISCLOSURE

Production of permselective ion exchange membrane from anhydrous, porous ceramic membrane having no measurable ion exchange capacity, e.g., formed from acidic or basic hydrous metal oxide, comprising exposing the ceramic membrane to an aqueous basic or acidic solution at elevated pressure, e.g., in excess of 1000 p.s.i. and at elevated temperature, e.g., above about 270° C., to at least partially rehydrate the surfaces and pore walls of said ceramic membane and convert same to an ion exchange membrane having substantially the transverse strength of the original ceramic membrane, and useful in fuel cells and batteries.

---

This invention relates to the preparation of ion exchange, permselective membranes and, more particularly, to methods of manufacturing high strength permselective membranes incorporating inorganic ion exchange materials.

Ion exchange is generally defined as the reversible exchange of ions between a liquid phase and a solid phase unaccompanied by any radical change in the solid structure. The solid structure is the ion exchanger and may be pictured as a network, lattice, or matrix incorporating charge sites each electrically balanced by a counter-ion of the opposite charge. The counter-ions are readily exchanged for mobile ions of a similar charge type existing in a solution surrounding and permeating the ion exchanger. When the counter-ions are negatively charged, the ion exchanger functions as an anion exchanger. When the counter-ions are positively charged, the ion exchanger functions as a cation exchanger.

Because of their ion selective characteristics, ion exchangers find extensive use in industrial processes for demineralizing water and other solvents of soluble ionic contaminants. In such processes, the ion exchangers generally take the forms of organic ion exchange or permselective membranes which by proper choice of organic materials are either cation or anion selective.

In use, the cation and anion selective organic membranes are alternately supported in vertical planes between a pair of plate electrodes to form an electrodialysis cell. The solution being demineralized is passed downward between the membranes and subjected to a transverse electric field extending between the electrodes. Under the influence of the electric field and the permselectivity of the organic membranes, ions of positive and negative charge type in the solution migrate through different membranes to form columns of dilute and concentrated aqueous solution which may be separately combined. Thus the electrodialysis cell employing organic membranes ideally operates to produce a rapid demineralization of the contaminated solution on a continuous basis.

In practice however, organic ion exchange or permselective membranes are subject to a number of critical limitations which produce a radical departure from the foregoing ideal operation of the electrodialysis cell. For example, organic membranes become fouled or plugged after relatively short periods of use. Being composed of organic materials, the membranes are also susceptible to attack by bacteria in solution. Further, organic permselective membranes lack the ability to selectively transport specific ions and tend to break down at elevated temperatures approaching and above 125° C.

The foregoing problems of organic membranes may be alleviated, to some extent, by inorganic ion exchangers. Until recently however, it has not been possible to form inorganic permselective membranes suitable for electrodialysis purposes. For this reason, inorganic ion exchangers have been utilized almost exclusively in particulate form. Even then their use has been primarily limited to column demineralization of soluble ionic contaminants wherein specific ions are absorbed by the particulate ion exchangers. Batch demineralization techniques using particulate inorganic ion exchangers have found only limited use in the demineralization and purification of water and other solutions.

Recently, however, various methods have been discovered for forming inorganic permselective membranes of insoluble hydrous metal oxides and acid salts thereof. The methods for forming such inorganic membranes are the subject matter of the co-pending patent application entitled "Preparation of Hydrous Metal Oxide Membranes, and Acid Salts Thereof," inventors, Frank C. Arrance and Carl Berger, Ser. No. 326,709, filed Nov. 29, 1963. Inorganic permselective membranes formed in accordance with the methods of the co-pending patent application possess the distinct advantages of being substantially free from fouling or plugging, highly selective of specific ions, free from attack by bacteria, susbtantially unaffected by high temperatures, and relatively inexpensive to produce. Therefore the inorganic membranes are ideally suited to use in electrodialysis cells for demineralizing water and other solvents of soluble ionic contaminants.

Although the inorganic permselective membranes of the co-pending patent application are relatively strong and have a transverse strength measured by a modulus of rupture generally in the range of 850 to 3,000 p.s.i., they do require careful handling and special storage to maintain their ion exchange characteristics over long periods of time.

Moreover, in some electrodialysis applications, and particularly in fuel cells and batteries wherein inorganic membranes may be utilized as permselective separators, membranes having higher strength characteristics than those presently producible by the methods of the aforementioned co-pending patent application are required.

Another co-pending application entitled "Introduction of Ion Exchange Properties into Inert Inorganic Membranes," Norman (NMI) Michael, inventor Ser. No. 327,114, filed Nov. 29, 1963, now abandoned, discloses a method whereby certain inorganic membranes can be activated for ion exchange purposes while retaining good strength characteristics; the present application is directed towards still further improvements in the method of preparation of inorganic permselective membranes, having substantially improved ion exchange characteristics, from membranes that are ordinarily inert and stable and have no measurable ion exchange capacity.

In view of the foregoing, it is a major object of my invention to provide a novel method for converting membranes of an anhydrous insoluble metal oxide or acid salt thereof, to a membrane which retains excellent transverse strengths and which results in a membrane having a greater degree of ion exchange capacity per unit of time, and greater conductivity than the membranes prepared in accordance with the aforementioned application Ser. No. 327,114.

It is still another object of my invention to provide a simple and inexpensive method for converting ordinarily inert, storage-stable inorganic membrane materials comprising anhydrous insoluble metal oxides and acid salts thereof having no measurable ion exchange activity, into ion exchange membranes.

These and other objects of my present invention will become clear by referring to the following detailed description.

In general, I have found that certain strong ceramic membranes formed from inorganic base materials of insoluble hydrous metal oxides and acid salts, upon treatment with acid or alkaline solution, at high pressures and temperatures may be converted to ion exchange membrances having substantially the transverse strength of the original ceramic membrane.

The ion exchange membranes thus formed, are particularly adapted for use in fuel cells and batteries where extremely strong, ion selective, membranes are required to maintain ion separation between the electrodes of the battery or fuel cell and wherein operating temperatures may approach and exceed 125° C. Moreover, the method of my invention has the distinct advantage of allowing membranes to be stored in an inert form for indefinite periods of time without change and to be converted into high strength permselective membranes as needed by simple procedures.

For the purposes of this invention, the term "insoluble hydrous metal oxides" includes those water insoluble solids containing one or more metal atoms, oxide atoms, and an indeterminate quantity of water. The insoluble hydrous metal oxides do not necessarly have a definite stoichiometric combination or definite crystal structure and may contain ionic impurities. The water insoluble hydrous metal oxides with which my invention is primarily concerned are the water-insoluble hydrous oxides of metals selected from the following groups of metals in the periodic table: III–A, III–B, IV–A, IV–B, V–A, V–B, VI–B, VII–B, VIII, the Lanthanide Series and the Actinide Series. The metals forming insoluble hydrous metal oxides which are of greatest practical importance at the present time are: Al (III), Ga (III), In (III), Sc (III), Y (III), Zr (IV), Ti (IV), Hf (IV), Pb (II), Si (IV), Ge (IV), Sn (IV), Sb (III, V), Bi (III), As (V), V (V), Nb (V), Ta (V), Cr (III), Mo (IV, VI), W (IV, VI), Mn (IV), Re (IV), Tc (IV), Fe (III), Co (II), Ni (II), Ac (III), Th (III), U (IV, VI), Pu (IV), La (III), Ce (IV), and Yb (III). Other valence states of some of these elements may also be useful.

The term "acid salts" includes water insoluble acid addition products of a hydrous metal oxide or a soluble salt of the metal and an acid or a salt of the acid. Preferably, the acids are multivalent oxy-acids and the acids and salts thereof include an oxygenated anion having a metal selected from the group consisting of P, Si, Ta, Sb, W, B, Nb, As, S, Se, Te, Po, V, and Mo, e.g., phosphoric acid, molybdic acid, or sodium tungstate.

Basically, the hydrous metal oxides forming the starting materials of the ceramic membranes of this invention may be precipitated from either a basic or acid solution, as described in detail in the aforementioned co-pending patent application Ser. No. 326,709. The acid salts forming the starting materials of the ceramic membranes, on the other hand, may be formed by adding an acid to a hydrous metal oxide, as described in the aforementioned co-pending patent application, or precipitated from an aqueous solution, as described in the co-pending patent application entitled, "Improvements in Inorganic Ion Exchange Membranes," Carl Berger, inventor, Ser. No. 326,740, filed Nov. 29, 1963. These co-pending patent applications are herein incorporated by reference.

By the term "porous membrane" I mean a membrane, thin plate, latticework, network, or matrix having an inner structure of interconnecting micropores between its opposing surfaces.

For the purpose of this patent application including the claims thereof, by "ceramic" it is intended to include all hydrous metal oxides and acid salts thereof which have been treated so as to remove essentially all bound water thereby forming an anhydrous crystalline structure having no measurable ion exchange capacity, e.g., by fusing of the ceramic.

By "ceramic membrane" it is meant a membrane formed either entirely or essentially of a ceramic as previously defined or a thin plate matrix of a strong inert and insoluble material having a ceramic, as previously defined, filling the voids of the matrix. Thus the "ceramic membrane" may be formed so as to consist partially, or substantially completely of a "ceramic" as just defined.

Generally, in this invention, the porous, ceramic membrane may be formed using conventional ceramic formation techniques such as flame-spraying, powder pressing and sintering, or slip casting and sintering. In each of the foregoing processes, the high temperature treatment of the hydrous metal oxide or acid salt base material removes the bound water content from the base material and with it the associated ion exchange capacity of the metal oxide or acid salt. It is believed that during my high temperature and pressure acid or alkaline treatment of the ceramic membrane, the base material of the ceramic membrane is partially rehydrated to its hydrous state with resulting ion exchange capacity.

In the aforementioned Ser. No. 327,114, the process of conversion of the membrane proceeds in the presence of steam. The membrane is supported in an autoclave and the autoclave is partially filled with water. The water in the autoclave is then heated to a high temperature preferably above 280° C. At such high temperatures, pressures in excess of 1,000 p.s.i. are developed within the autoclave and the water is converted to steam. The temperature of the steam is controlled to be above the vaporization or saturation temperature of steam for the pressure in the autoclave. Accordingly, the steam is by definition superheated. After a period of time, the continuous action of the steam at high pressure upon the membrane apparently breaks the inert linkages of the ceramic allowing reaction between the material forming the porous ceramic and the steam. The reaction rehydrates the surfaces of the membrane and the walls of the pores thereof to either a hydrous metal oxide or acid salt depending upon the original base material of the ceramic while leaving the strong inner structure of the membrane substantially unreacted and intact. Rehydration of the pore walls as well as the surface creates an ion-conductive path necessary in many ion exchange applications such as desalinization by electrodialysis.

Within limits the temperature and the exposure time of the anhydrous ceramic membrane to the steam determine the degree of rehydration of the membrane. However, the degree of rehydration is substantially enhanced, when operating at the various temperature and pressure conditions and time periods set out in the aforementioned Ser. No. 327,114, by the replacement of water in the autoclave with an appropriate acid and/or alkaline solution. More specifically, it has been found that the conductivity and the ion exchange capacity of the activated membranes of my invention may be substantially increased by the use of acid or alkaline solution and further, that the rate of rehydration may be increased some 200 to 300 percent.

In particular, when the ceramic membrane is formed with an acid salt of a hydrous metal oxide material, the addition of an alkaline solution of pH 8–14 in the autoclave materially improves the conductance and ion exchange capacity of the activated membrane. In the case of ceramic membranes formed from a basic hydrous metal oxide, the addition of an acidic solution of pH 0–6 in the autoclave materially improves the conductance and ion exchange capacity of the activated membrane. For anhydrous ceramic membranes formed with acidic hydrous metal oxides, i.e., insoluble hydrous oxides of the metals of Sb (III, V), Nb (V), Ta (V), Mo (VI), W (VI), U (VI) and V (V), I have found that alkaline solution of pH 8–14 under conditions to be specified, are required. In the case of ceramic materials that are formed from an amphoteric hydrous metal oxide, either acid or basic solution may be initially employed. In general, the acid solution pH ranges between 0–6 and the alkaline solution pH between 8–14.

As in Ser. No. 327,114, previously mentioned, the actual upper and lower limits of exposure time and steam pressure vary from membrane to membrane and for each pressure there are different exposure times. Therefore, it is not practical to set forth rigid working limits. However, by way of example, a practical lower operating limit may be in the order of an exposure time of 30 hours at pressures of 1,000 p.s.i. within the autoclave and an upper limit of an exposure time of 2,500 hours at a pressure of 30,000 p.s.i. Furthermore, for most sintered ceramic membranes we have found that an exposure time of between 50 and 500 hours at pressures in a range of 1,000 to 3,000 p.s.i. and 270° C. to 400° C. respectively, are necessary to rehydrate more than about 5% of an anhydrous ceramic membrane. While the surfaces and pore walls of the membrane are activated and rehydrated a substantial portion of the activatable material (about 25% or more and which shall be termed herein as the inner core of the material) remains intact and unreacted. The activated membranes produced by the foregoing method thus have a transverse strength in the range of about 3,000 to 7,000 p.s.i., a resistivity of about 30 to 150 ohm-cm., and an ion exchange capacity of about 0.4 to 1.4 meq./gm.

The improvement provided by the addition of an acid or alkaline environment in the autoclave as described is completely unexpected and is not completely understood; however, the improvements are believed to be due primarily to the catalytic action of the acid or alkali on the surfaces of the ceramic membrane. More specifically, when the solution containing the acid or alkali is heated, steam is formed in the autoclave which carries the reagent into the surface and into the pores of the porous ceramic. It appears that the acid or alkali catalyzes the surfaces of the membrane and the walls of the pores to accelerate the rehydration reaction. It is also our belief that the acid or alkali combines with the steam to break the inert linkages of the ceramic to further the primary chemical reaction between the base material of the membrane and the steam to more fully rehydrate, and thereby enhance the activation of the membrane.

Specific examples for each class of hydrous metal oxide and for the acid salts follow. In each of the following examples, the metal oxide and acid base starting materials forming the ceramic membranes were produced in accord with the teachings of the foregoing co-pending patent applications.

The method of measuring resistivity can vary depending upon the particular system in which the membrane is placed. The resistivity of all the membranes in the following examples is given in terms of 90° C. and 60% relative humidity (R.H.) for the sake of uniformity. Extrapolations have been made to 90° C. and 60% relative humidity in many instances. The resistivity figures are therefore approximate.

HYDROUS METAL OXIDES.—GROUP III

Example I

A flame-sprayed aluminum oxide membrane having a resistivity of $3 \times 10^6$ ohm-cm., a modulous of rupture of 6,500 p.s.i., and no ion exchange capacity was supported in a 10 liter autoclave containing 1 liter of a 50% hydrochloric acid solution. The alumina membrane was then exposed to steam at 1,100 p.s.i. and approximately 300° C. for 325 hours.

After exposure, the membrane had a resistivity of 35 ohm-cm., an ion exchange capacity of 1.0 meq./gm., and a modulus of rupture of 5,200 p.s.i.

Example II

A porous ceramic membrane 2″ in diameter and 0.02″ thick was prepared from scandium oxide ($Sc_2O_3$) by compacting at 20 tons total load and sintering at 1,800° C. As fired, the membrane had a resistivity of $2.7 \times 10^6$ ohm-cm., a modulus of rupture of 5,000 p.s.i. and no measurable ion exchange capacity. The ceramic membrane was supported in a 10 liter autoclave containing 1 liter of a 35% phosphoric acid solution and exposed to superheated steam at 2,000 p.s.i. and approximately 340° C. for 250 hours.

After exposure to the steam, the membrane had a resistivity of 50 ohm-cm., a modulus of rupture of 4,700 p.s.i., and an ion exchange capacity of 1.05 meq./gm.

Example III

A porous ceramic membrane 0.02″ thick was prepared by the method of Example II from yttrium oxide ($Y_2O_3$). As fired, the membrane had a resitivity of $2.5 \times 10^6$ ohm-cm. at 90° C. and 60% R.H., a modulus of rupture of 5,100 p.s.i., and no measurable ion exchange capacity. The membrane was supported in a 10 liter autoclave containing 1 liter of a 60% solution of phosphoric acid and exposed to steam at 2,300 p.s.i. and approximately 350° C. for 230 hours.

After exposure to the steam, the membrane had a resistivity of 40 ohm-cm., a modulus of rupture of 4,800 p.s.i. and an ion exchange capacity of 1.4 meq./gm.

GROUP IV

Example IV

A porous ceramic membrance 0.02″ thick was prepared by the method of Example II from tin oxide ($SnO_2$). The fired membrane had a resistivity of $2.5 \times 10^6$ ohm-cm. at 90° C. and 60% R.H., a modulus of rupture of 6,000 p.s.i., and no measurable ion exchange capacity.

The membrane was supported in an autoclave containing a 37% solution of hydrochloric acid and exposed to superheated steam at 3,000 ps.i. and approximately 370° C. for 200 hours.

After exposure tot the steam, the membrane had a resistivity of 50 ohm-cm., a modulus of rupture of 5,000 p.s.i., and an ion exchange capacity of 0.9 meq./gm.

Example V

A flame-sprayed zirconia membrane having a resistivity of $2 \times 10^6$ ohm-cm., a moduls of rupture of 7,500 p.s.i. and no apparent ion exchange capacity was supported in a 10 liter autoclave containing 1 liter of a 10% solution of phosphoric acid. The zirconium membrane was exposed to steam at 1,500 p.s.i., and approximately 315° C. for 400 hours.

After exposure to the steam, the membrane had a resistivity of 45 ohm-cm. at 90° C. and 60% R.H., a modulus of rupture of 7,200 p.s.i. and in ion exchange capacity of 0.75 meq./gm.

GROUP V

Example VI

A membrane 2″ in diameter and 0.02″ thick was prepared from antimony oxide ($Sb_2O_3$) compacting at 20 tons total load and sintering at 500° C. As fired, the membrane had a resistivity of $2.0 \times 10^6$ ohm-cm. at 90° C. and 60% R.H., a modulus of rupture of 4,500 p.s.i. and no measurable ion exchange capacity. The membrane was supported in an autoclave containing a 70% solution of phosphoric acid and exposed to steam at 2,000 p.s.i. and approximately 340° C. for 200 hours.

After exposure to the steam, the membrane had a resistivity of 60 ohm-cm., a modulus of rupture of 4,300 p.s.i., and an ion exchange capacity of 0.7 meq./gm.

Example VII

A membrane 2″ in diameter and 0.02″ thick was prepared from tellurium oxide ($Te_2O_5$) by compacting at 20 tons total load and sintering at 1,000° C. As fired, the membrane had a resistivity of $2.7 \times 10^6$ ohm-cm. at 90° C. and 60% R.H., a modulus of rupture of 5,700 p.s.i., and no measurable ion exchange capacity. The membrane was supported in an autoclave containing a 25% hydrochloric acid solution and exposed to superheated steam at 2,300 p.s.i. and approximately 350° C. for 375 hours.

After exposure to the steam, the membrane had a resistivity of 38 ohm-cm., a modulus of rupture of 5,400 p.s.i. and an ion exchange capacity of 1.4 meq./gm.

GROUP VI

Example VIII

A membrane 2" in diameter and 0.02" thick was prepared from chromium oxide ($Cr_2O_3$) by compacting at 20 tons total load and sintering at 1,800° C. As fired, the membrane had a resistivity of $2.9 \times 10^6$ ohm/cm. at 90° C. and 60% R.H., a modulus of rupture of 5,000 p.s.i. and no measurable ion exchange capacity. The membrane was supported in a 10 liter autoclave containing 1 liter of a 40% solution of phosphoric acid and exposed to steam at 3,000 p.s.i. and approximately 370° C. for 250 hours.

After exposure to the steam, the membrane had a resistivity of 30 ohm-cm., a modulus of rupture of 4,700 p.s.i., and an ion exchange capacity of 0.8 meq./gm.

Example IX

A membrane 2" in diameter and 0.02" thick was prepared from tungstic oxide by compacting at 20 tons total load and sintering at 1,000° C. As fired, the membrane had a resistivity of $3.8 \times 10^6$ ohm/cm. at 90° C. and 60% R.H., a modulus of rupture of 7,000 p.s.i. and no measurable ion exchange capacity. The membrane was supported in a 10 liter autoclave containing 1 liter of a 30% solution sodium hydroxide and exposed to superheated steam at 2,300 p.s.i. and approximately 350° C. for 350 hours.

After exposure to the steam, the membrane had a resistivity of 55 ohm/cm., a modulus of rupture of 6,750 p.s.i. and an ion exchange capacity of 1.3 meq./gm.

GROUP VII

Example X

A membrane 2" in diameter and 0.02" thick was prepared from manganese oxide ($MnO_2$) by compacting at 20 tons total load and sintering at 1,400° C. As fired, the membrane had a resistivity of $2.5 \times 10^6$ ohm/cm. at 90° C. and 60% R.H., a modulus of rupture of 4,300 p.s.i. and no measurable ion exchange capacity. The membrane was supported in a 10 liter autoclave containing 1 liter of a 10% hydrochloric acid solution and exposed to superheated steam at 2,300 p.s.i. and approximately 350° C. for 300 hours.

After exposure to the steam, the membrane had a resistivity of 85 ohm/cm., a modulus of rupture of 4,200 p.s.i., and an ion exchange capacity of 0.3 meq./gm.

GROUP VIII

Example XI

A membrane 2" in diameter and 0.02" thick was prepared from ferric oxide ($Fe_2O_3$) by compacting at 20 tons total load and sintering at 1,200° C. As fired, the membrane had a resistivity of $2.8 \times 10^6$ ohm/cm. at 90° C. and 60% R.H., a modulus of rupture of 7,650 p.s.i., and no measurable ion exchange capacity. The membrane was supported in a 10 liter autoclave containing 1 liter of a 15% solution of phosphoric acid and exposed to steam at 2,500 p.s.i. and approximately 355° C. for 400 hours.

After exposure to the steam, the membrane had a resistivity of 70 ohm/cm., a modulus of rupture of 7,000 p.s.i., and an ion exchange capacity of 0.5 meq./gm.

LANTHANUM SERIES

Example XII

A membrane 2" in diameter and .02" thick was prepared from cerium oxide ($Ce_2O_3$) by compacting at 20 tons total load and sintering at 300° C. As fired, the membrane had a resistivity of $2.9 \times 10^6$ ohm-cm. at 90° C. and 60% R.H., a modulus of rupture of 8,000 p.s.i. and no measurable ion exchange capacity. The membrane was supported in a 10 liter autoclave containing 1 liter of a 10% solution of phosphoric acid and exposed to steam at 2,300 p.s.i. and approximately 350° C. for 350 hours.

After exposure to the steam, the membrane had a resistivity of 79 ohm-cm., a modulus of rupture of 7,100 p.s.i., and an ion exchange capacity of 1.0 meq/gm.

ACTINIUM SERIES

Example XIII

A membrane 2" in diameter and 0.02" thick was prepared from thorium oxide ($ThO_2$) by compacting at 20 tons total load and sintering at 1,700° C. As fired, the membrane had a resistivity of $2.8 \times 10^6$ ohm-cm. at 90° C. and 60% R.H., a modulus of rupture of 4,300 p.s.i. and no measurable ion exchange capacity. The membrane was supported in a 10 liter autoclave containing 1 liter of a 50% hydrochloric acid solution and exposed to superheated steam at 3,000 p.s.i. and approximately 370° C. for 400 hours.

After exposure to the steam, the membrane had a resistivity of 35 ohm-cm., a modulus of rupture of 3,450 p.s.i. and an ion exchange capacity of 1.1 meq./gm.

ACID SALTS

Example XIV

Titanium pyrophosphate ($TiP_2O_7$) was prepared by dissolving 200 grams of titanium chloride ($TiCl_3$) in 500 milliliters of water and precipitating titanium phosphate ($TiPO_4$) with a 1.0 M solution and phosphoric acid at a pH of 3. The precipitate was washed, dried for 24 hours at 110° C., granulated and pressed into 2" diameter membranes, 0.03" thick at 15 tons total load. The membranes were then sintered at 1,000° C. for 15 hours to form the pyrophosphate. The titanium pyrophosphate membranes thus formed had a resistivity of $1.3 \times 10^6$ ohm-cm., a modulus of rupture of 6,000 p.s.i., and no ion exchange capacity. The membranes were supported in a 10 liter autoclave containing 1 liter of a 20% sodium hydroxide solution and subjected to steam at 2,300 p.s.i. and approximately 350° C. for 50 hours.

After exposure to steam, the membranes had a resistivity of 40 ohm-cm. at 90° C. and 60% R.H., a modulus of rupture of 5,500 p.s.i. and an ion exchange capacity of 0.95 meq./gm.

Example XV

A membrane 2" in diameter and 0.02" thick was prepared from zirconyl phosphate by compacting at 20 tons total load and sintering at 1,600° C. As fired, the membrane had a resistivity of $1.5 \times 10^6$ ohm-cm. at 90° C. and 60% R.H., a modulus of rupture of 5,000 p.s.i., and no measurable ion exchange capacity. The membrane thus formed was supported in an autoclave containing a 30% solution of potassium hydroxide exposed to superheated steam at 1,100 p.s.i. and approximately 300° C. for 100 hours.

After exposure to steam, the membrane had a resistivity of 80 ohm-cm., a modulus of rupture of 5,100 p.s.i., and an ion exchange capacity of 0.5 meq./gm.

Example XVI

A membrane 2" in diameter and 0.02" thick was prepared from zirconium antimonate by compacting at 20 tons total load and sintering at 1,700° C. As fired, the membrane had a resistivity of $2.9 \times 10^6$ ohm-cm. at 90° C.

and 60% R.H., a modulus of rupture of 4,300 p.s.i., and no measurable ion exchange capacity. The membrane was supported in a 10 liter autoclave containing 1 liter of a 30% solution of sodium hydroxide and exposed to steam at 2,000 p.s.i. and approximately 340° C. for 50 hours.

After exposure to the steam, the membrane had a resistivity of 35 ohm-cm., a modulus of rupture of 4,100 p.s.i., and an ion exchange capacity of 1.4 meq./gm.

Example XVII

A membrane 2" in diameter and 0.02" thick was prepared from zirconium borate by compacting at 20 tons total load and sintering at 1,800° C. As fired, the membrane had a resistivity of $3.9 \times 10^6$ ohm-cm. at 90° C. and 60% R.H., a modulus of rupture of 4,000 p.s.i., and no measurable ion exchange capacity. The membrane was supported in a 10 liter autoclave containing 1 liter of a 3% solution of cerium hydroxide and exposed to superheated steam at 2,300 p.s.i. and approximately 350° C. for 75 hours.

After exposure to the steam, the membrane had a resistivity of 90 ohm-cm., a modulus of rupture of 3,800 p.s.i., and an ion exchange capacity of 0.7 meq./gm.

Example XVIII

A membrane 2" in diameter and 0.02" thick was prepared from scandium niobate by compacting at 20 tons total load and sintering at 1,900° C. As fired, the membrane had a resistivity of $3.9 \times 10^6$ ohm-cm. at 90° C. and 60% R.H., a modulus of rupture of 3,400 p.s.i., and no measurable ion exchange capacity. The membrane was supported in a 10 liter autoclave containing 1 liter of a 2% sodium hydroxide and exposed to steam at 3,000 p.s.i., and approximately 370° C. for 80 hours.

After exposure to the steam, the membrane had a resistivity of 135 ohm-cm., a modulus of rupture of 3,000 p.s.i., and an ion exchange capacity of 0.15 meq./gm.

Example XIX

A membrane 2" in diameter and 0.02" thick was prepared from chromium tungstate by compacting at 20 tons total load and sintering at 1,800° C. As fired, the membrane had a resistivity of $4.0 \times 10^6$ ohm-cm. at 90° C. and 60% R.H., a modulus of rupture of 5,000 p.s.i., and no measurable ion exchange capacity. The membrane was supported in a 10 liter autoclave containing 1 liter of a 40% solution of KOH and exposed to steam at 1,500 p.s.i. and approximately 315° C. for 75 hours.

After exposure to the steam, the membrane had a resistivity of 75 ohm-cm., a modulus of rupture of 4,700 p.s.i., and an ion exchange capacity of 0.75 meq./gm.

Example XX

A membrane 2" in diameter and 0.02" thick was prepared from ferric niobate by compacting at 20 tons total load and sintering at 1,800° C. As fired, the membrane had a resistivity of $4.3 \times 10^6$ ohm-cm., at 90° C. and 60% R.H., a modulus of rupture of 3,700 p.s.i., and no measurable ion exchange capacity. The membrane was supported in a 10 liter autoclave containing 1 liter of a 20% solution of sodium hydroxide and exposed to steam at 2,500 p.s.i. and approximately 355° C. for 75 hours.

After exposure to the steam, the membrane had a resistivity of 150 ohm-cm., a modulus of rupture of 3,400 p.s.i., and an ion exchange capacity of 0.7 meq./gm.

Example XXI

A membrane 2" in diameter and 0.02" thick was prepared from aluminum tantalate by compacting at 20 tons total load and sintering at 1,600° C. As fired, the membrane had a resistivity of $3.5 \times 10^6$ ohm-cm., at 90° C. and 60% R.H., a modulus of rupture of 4,300 p.s.i., and no measurable ion exchange capacity. The membrane was supported in a 10 liter autoclave containing 1 liter of a 45% solution KOH and exposed to steam at 2,300 p.s.i. and approximately 350° C. for 100 hours.

After exposure to the steam, the membrane had a resistivity of 42 ohm-cm., a modulus of rupture of 4,200 p.s.i., and an ion exchange capacity of 1.2 meq./gm.

Example XXII

A membrane 2" in diameter and 0.02" thick was prepared from cerium niobate compacting at 20 tons total load and sintering at 1,800° C. As fired, the membrane had a resistivity of $4.9 \times 10^6$ ohm-cm. at 90° C. and 60% R.H., a modulus of rupture of 5,800 p.s.i., and no measurable ion exchange capacity. The membrane was supported in a 10 liter autoclave containing 1 liter of a 15% solution sodium hydroxide and exposed to steam at 2,000 p.s.i. and approximately 370° C. for 75 hours.

After exposure to the steam, the membrane had a resistivity of 110 ohm-cm., a modulus of rupture of 5,400 p.s.i., and an ion exchange capacity of 0.7 meq./gm.

Example XXIII

A membrane 2" in diameter and 0.02" thick was prepared from thorium methaphosphate by compacting at 20 tons total load and sintering at 1,500° C. As fired, the membrane had a resistivity of $3.6 \times 10^6$ ohm-cm. at 90° C. and 60% R.H., a modulus of rupture of 5,600 p.s.i., and no measurable ion exchange capacity. The membrane was supported in a 10 liter autoclave containing 1 liter of a 30% KOH solution and exposed to steam at 2,500 p.s.i. and approximately 355° C. for 45 hours.

After exposure to the steam, the membrane had a resistivity of 30 ohm-cm., a modulus of rupture of 5,300 p.s.i., and an ion exchange capacity of 1.6 mq./gm.

While various specific examples have been set forth, it is to be borne in mind that they are merely illustrative of my invention. The invention is defined by the following claims.

I claim:

1. A method of producing a water-insoluble, ion exchange membrane from an anhydrous, porous ceramic membrane having no measurable ion exchange capacity, comprising the step of treating said ceramic membrane with an aqueous solution selected from the group consisting of an aqueous acid solution and an aqueous basic solution, at a temperature ranging from 270° C. to 400° C. and a pressure in a range of 1000 to 3000 p.s.i., for a period between 50 and 500 hours, to at least partially rehydrate the surfaces and pore walls of said ceramic membrane and convert said ceramic membrane into an ion exchange membrane.

2. The method of claim 1, wherein said ceramic membrane is a zirconia membrane and said aqueous solution is an aqueous acid solution.

3. A method of producing a water-insoluble, permselective membrane from an anhydrous porous ceramic membrane having no measurable ion exchange capacity, formed from a basic hydrous metal oxide base material comprising the step of exposing said ceramic membrane to an aqueous solution having a pH in the range of 0–6 at a pressure above 1,000 p.s.i. and a temperature above about 270° C. to rehydrate the surfaces and pore walls of said membrane while leaving the inner surface of said membrane intact and convert said ceramic membrane to an ion exchange membrane.

4. The method of claim 3 wherein the metallic element of said basic hydrous metal oxide is selected from the group consisting of Al, Ga, In, Sc, Y, Zr, Ti, Hf, Pb, Si, Ge, Sn, Bi, As, Cr, Mn, Re, Tc, Fe, Co, Ni, Ac, Th, Pu, La, Ce, and Yb.

5. A method of producing a water-insoluble, permselective membrane from an anhydrous porous ceramic membrane having no measurable ion exchange capacity, formed from an acidic hydrous metal oxide base material comprising the step of treating said ceramic membrane with an aqueous solution of pH 8–14 at a pressure above 1,000 p.s.i. and a temperature in excess of about 270° C.

until the surfaces and pore walls of said membrane are at least partially rehydrated and have a measurable ion exchange capacity.

6. The method of claim 5 wherein the metallic element of said acidic hydrous metal oxide is selected from the group consisting of Sb, V, Nb, Ta, Ma, W, and U.

7. A method of producing a water-insoluble, permselective membrane from an anhydrous porous ceramic membrane having no measurable ion exchange capacity, formed from an acid salt comprising the step of treating said ceramic membrane with an aqueous solution of pH 8–14 at a pressure above 1,000 p.s.i. and a temperature above 270° C., to at least partially rehydrate the surfaces and pore walls of said membrane and convert said ceramic membrane to an ion exchange membrane.

8. A method of producing a water-insoluble, permsetive membrane, comprising the steps of:
   precipitating a hydrous metal oxide from an aqueous solution;
   mixing said hydrous metal oxide with an acidic anion to form an acid salt;
   forming an anhydrous, porous ceramic membrane having no measurable ion exchange capacity from said acid salt;
   and contacting said ceramic membrane with a hydroxide solution of pH 8–14 at a pressure in excess of 1,000 p.s.i. and at a temperature in excess of 270° C., to at least partially rehydrate the surfaces and pore walls of said membrane and convert said ceramic mambrane to an ion exchange membrane.

References Cited
UNITED STATES PATENTS

| | | | |
|---|---|---|---|
| 2,617,712 | 11/1952 | Bond | 23—112 |
| 2,631,134 | 3/1953 | Iler et al. | 252—313 |
| 3,276,910 | 10/1966 | Grasselli et al. | 136—86 |

JOHN H. MACK, *Primary Examiner.*

D. R. JORDAN, *Assistant Examiner.*